(12) United States Patent
Suzuki et al.

(10) Patent No.: US 8,912,762 B2
(45) Date of Patent: Dec. 16, 2014

(54) CHARGING METHOD FOR NON-AQUEOUS ELECTROLYTE SECONDARY BATTERY BY REPEATING A SET OF CONSTANT CURRENT CHARGE AND CONSTANT VOLTAGE CHARGE AND BATTERY PACK IMPLEMENTING THE CHARGING METHOD

(75) Inventors: Tatsuhiko Suzuki, Osaka (JP); Akira Nagasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 13/388,636

(22) PCT Filed: Dec. 2, 2010

(86) PCT No.: PCT/JP2010/007027
§ 371 (c)(1),
(2), (4) Date: Feb. 2, 2012

(87) PCT Pub. No.: WO2011/074199
PCT Pub. Date: Jun. 23, 2011

(65) Prior Publication Data
US 2012/0133338 A1     May 31, 2012

(30) Foreign Application Priority Data
Dec. 14, 2009   (JP) .................................. 2009-282511

(51) Int. Cl.
*H01M 10/44* (2006.01)
*H01M 10/46* (2006.01)
*H01M 4/525* (2010.01)
*H01M 10/052* (2010.01)
*H02J 7/00* (2006.01)

(52) U.S. Cl.
CPC .............. *H01M 10/44* (2013.01); *H01M 4/525* (2013.01); *H01M 10/052* (2013.01); *H02J 7/0073* (2013.01); *Y02E 60/122* (2013.01)
USPC ...................................................... 320/160

(58) Field of Classification Search
CPC ....... H02J 7/022; H02J 7/0031; H02J 7/0047; H02J 7/0073; H02J 7/0081; H02J 7/008
USPC .......................... 320/128, 137, 160, 162, 164
See application file for complete search history.

(56) References Cited

U.S. PATENT DOCUMENTS 6,081,097 A * 6/2000 Seri et al. ....................... 320/128
6,087,810 A   7/2000 Yoshida
(Continued)

FOREIGN PATENT DOCUMENTS

JP          07-296853         11/1995
JP          9-121462          5/1997
(Continued)

OTHER PUBLICATIONS

International Search Report issued in International Patent Application No. PCT/JP2010/007027, mailed Feb. 15, 2011.

*Primary Examiner* — Edward Tso
(74) *Attorney, Agent, or Firm* — McDermott Will & Emery LLP

(57) ABSTRACT

In the present method, a non-aqueous electrolyte secondary battery is charged by repeating n+1 times a constant current charge and a subsequent constant voltage charge, where n is an integer of 1 or more. (1) An $n^{th}$ charge comprises charging the secondary battery at a current Ic(n) to a voltage Ec(n), and subsequently charging the secondary battery at the voltage Ec(n) until the current decreases from Ic(n) to Ic(n+1). (2) An $(n+1)^{th}$ charge comprises charging the secondary battery at the current Ic(n+1) to a voltage Ec(n+1), and subsequently charging the secondary battery at the voltage Ec(n+1) until the current decreases from Ic(n+1) to Ic(n+2). Consequently, the charge time of the non-aqueous electrolyte secondary battery can be shortened while deterioration of the battery can be suppressed.

5 Claims, 4 Drawing Sheets

(56) References Cited

U.S. PATENT DOCUMENTS

| | | | |
|---|---|---|---|
| 2005/0052157 A1* | 3/2005 | Kinoshita et al. | 320/128 |
| 2008/0129252 A1 | 6/2008 | Nishino | |
| 2010/0207583 A1* | 8/2010 | Tanaka et al. | 320/134 |
| 2011/0267006 A1* | 11/2011 | Tanno | 320/116 |

FOREIGN PATENT DOCUMENTS

| | | |
|---|---|---|
| JP | 09-289741 | 11/1997 |
| JP | 10-145979 | 5/1998 |
| JP | 2003-333706 | 11/2003 |
| JP | 2007-228701 | 9/2007 |
| JP | 2008-130278 | 6/2008 |
| JP | 2008-167642 | 7/2008 |
| JP | 2009-022078 | 1/2009 |
| JP | 2009-033843 | 2/2009 |
| JP | 2009-290931 | 12/2009 |

* cited by examiner

Charge current

US 8,912,762 B2

CHARGING METHOD FOR NON-AQUEOUS ELECTROLYTE SECONDARY BATTERY BY REPEATING A SET OF CONSTANT CURRENT CHARGE AND CONSTANT VOLTAGE CHARGE AND BATTERY PACK IMPLEMENTING THE CHARGING METHOD

RELATED APPLICATIONS

This application is the U.S. National Phase under 35 U.S.C. §371 of International Application No. PCT/JP2010/007027, filed on Dec. 2, 2010, which in turn claims the benefit of Japanese Application No. 2009-282511, filed on Dec. 14, 2009, the disclosures of which Applications are incorporated by reference herein.

TECHNICAL FIELD

The present invention relates to a technique for shortening charge time while suppressing deterioration of non-aqueous electrolyte secondary batteries.

BACKGROUND ART

Lithium ion secondary batteries having high voltage and high energy density have been widely used as power sources for electronic devices such as notebook computers, cellular phones, and Audio-Visual devices. Lithium ion secondary batteries belong to non-aqueous electrolyte secondary batteries using non-aqueous solution-based electrolyte as electrolyte, and carbon materials capable of absorbing and desorbing lithium are generally used as negative electrode active material. As positive electrode active material, lithium-containing composite oxide ($LiCoO_2$ etc.) is used.

In recent years, as smaller electronic devices having higher performance have been realized, demand for lithium ion secondary batteries having higher capacity and longer life has been increasing. Also, as use frequency of electronic devices has been increasing along with development of ubiquitous society, demand for shortening of charge time has been increasing greatly.

In order to achieve secondary batteries having higher capacity, it is generally effective to increase the filling density of active material. In lithium ion secondary batteries, however, if the filling density of the active material is increased, lithium ion-acceptability of active material is likely to decline during the charge. As a result, the charge and discharge cycle life characteristics (cycle characteristics, hereinafter) may be deteriorated.

Meanwhile, in order to achieve non-aqueous electrolyte secondary batteries having longer life, that is, improved cycle characteristics, it has so far been proposed to reduce the charge current. By reducing the charge current, it is possible to prevent deterioration in the cycle characteristics even when the active material is filled at high density.

Further, when the upper limit of the charge voltage is high, decomposition of the non-aqueous electrolyte is accelerated, which leads to deterioration in the cycle characteristics. Therefore, deterioration in the cycle characteristics can be prevented by suppressing the upper limit of the charge voltage.

However, for example, if the charge current is reduced, the quantity of electricity that can be charged to secondary batteries per unit time is decreased, and the charge time naturally becomes longer. Shortening of the charge time of secondary batteries has been demanded in various fields. Therefore, this demand cannot be met if the charge current is reduced simply.

Meanwhile, if the upper limit of the charge voltage is suppressed, the discharge capacity is reduced, whereby the time during which devices can be used by one charge is shortened.

Therefore, in order to shorten the charge time without deteriorating the cycle characteristics of secondary batteries, various charge methods have so far been proposed. For example, Patent Literature 1 proposes firstly charging a lithium ion secondary battery at a high constant current, reducing the charge current when the terminal voltage of the battery reaches a predetermined cutoff voltage to lower the battery voltage, and also switching the cutoff voltage after switching of the current according to a fall of voltage due to internal resistance of the battery.

Also, Patent Literature 2 proposes repeating a procedure of charging firstly a lithium ion secondary battery at a high constant current until the battery voltage reaches a predetermined value, and reducing the current when the battery voltage reaches the predetermined voltage to lower the battery voltage.

CITATION LIST

Patent Literature

[PTL 1] Japanese Laid-Open Patent Publication No. Hei 10-145979

[PTL 2] Japanese Laid-Open Patent Publication No. Hei 7-296853

SUMMARY OF INVENTION

Technical Problem

In Patent Literature 1, when the charge current is switched, the cutoff voltage is also switched by calculating the internal resistance of the battery and adding a voltage drop corresponding to the internal resistance to an initial cutoff voltage (end-of-charge voltage). However, if the cutoff voltage is set by the method of Patent Literature 1, the cutoff voltage may become too high when the internal resistance of the battery is increased. In such a case, the secondary battery is overcharged, which leads to deterioration in the cycle characteristics.

Further, in Patent Literatures 1 and 2, since the battery is charged at a high current until it reaches the cutoff voltage that is roughly equal to the end-of-charge voltage, or the specified voltage, deterioration in the secondary battery may not be suppressed sufficiently. Also, since rapid switching of the charge current accompanying a fall of battery voltage is performed, the charge time tends to become longer.

Therefore, the present invention aims to provide an effective means for shortening the charge time of the non-aqueous electrolyte secondary batteries.

Solution to Problem

An aspect of the present invention relates to a method of charging a non-aqueous electrolyte secondary battery, comprising repeating n+1 times a constant current charge and a subsequent constant voltage charge, where n is an integer of 1 or more, wherein (1) an $n^{th}$ charge comprises charging the secondary battery at a current $Ic(n)$ to a voltage $Ec(n)$, and subsequently charging the secondary battery at the voltage $Ec(n)$ until the current decreases from $Ic(n)$ to $Ic(n+1)$, and (2) an $(n+1)^{th}$ charge comprises charging the secondary battery at the current $Ic(n+1)$ to a voltage $Ec(n+1)$, and subsequently charging the secondary battery at the voltage Ec(n+1) until the current decreases from Ic(n+1) to Ic(n+2).

That is, in the present invention, the charge is performed at constant voltage by multi-step, and the current value is decreased gradually when the step charge is switched. When the multi-step charge is composed of 3 steps, for example, a constant voltage Ec(1) at a first step is 3.8 to 4.0 V, and a constant current Ic(1) at the first step is 0.7 to 2.0 It (0.7 to 2.0 C); Ec(2)>Ec(1) where Ec(2) is a constant voltage at a second step, and Ic(2)<Ic(1) where Ic(2) is a constant current at the second step; and Ec(3)>Ec(2) where Ec(3) is a constant voltage at a third step, and Ic(3)<Ic(2) where Ic(3) is a constant current at the third step.

When the multi-step charge as above is composed of 2 steps, for example, a constant voltage Ec(1) at a first step is 3.8 to 4.0, and a constant current Ic(1) at the first step is 0.7 to 2.0 It (0.7 to 2.0 C); a constant voltage Ec(2) at a second step is 4.0 to 4.4 V, and a constant current Ic(2) at the second step is 0.3 to 0.7 It (0.3 to 0.7 C).

Another aspect of the present invention is a battery pack comprising at least a non-aqueous electrolyte secondary battery, a charge circuit that charges the secondary battery by an electric power from an outer power source, and a control unit that controls charge of the secondary battery by the charge circuit, wherein the control unit controls the charge circuit such that the charge circuit charges the secondary battery by repeating n+1 times a constant current charge and a subsequent constant voltage charge, where n is an integer of 1 or more, (1) an $n^{th}$ charge comprises charging the secondary battery at a current Ic(n) to a voltage Ec(n), and subsequently charging the secondary battery at the voltage Ec(n) until the current decreases from Ic(n) to Ic(n+1), and (2) an $(n+1)^{th}$ charge comprises charging the secondary battery at a current Ic(n+1) to a voltage Ec(n+1), and subsequently charging the secondary battery at the voltage Ec(n+1) until the current decreases from Ic(n+1) to Ic(n+2).

Advantageous Effects of Invention

According to the present invention, the charge time can be shortened without damaging significantly the charge and discharge cycle life characteristics of non-aqueous electrolyte secondary batteries represented by lithium ion secondary batteries.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
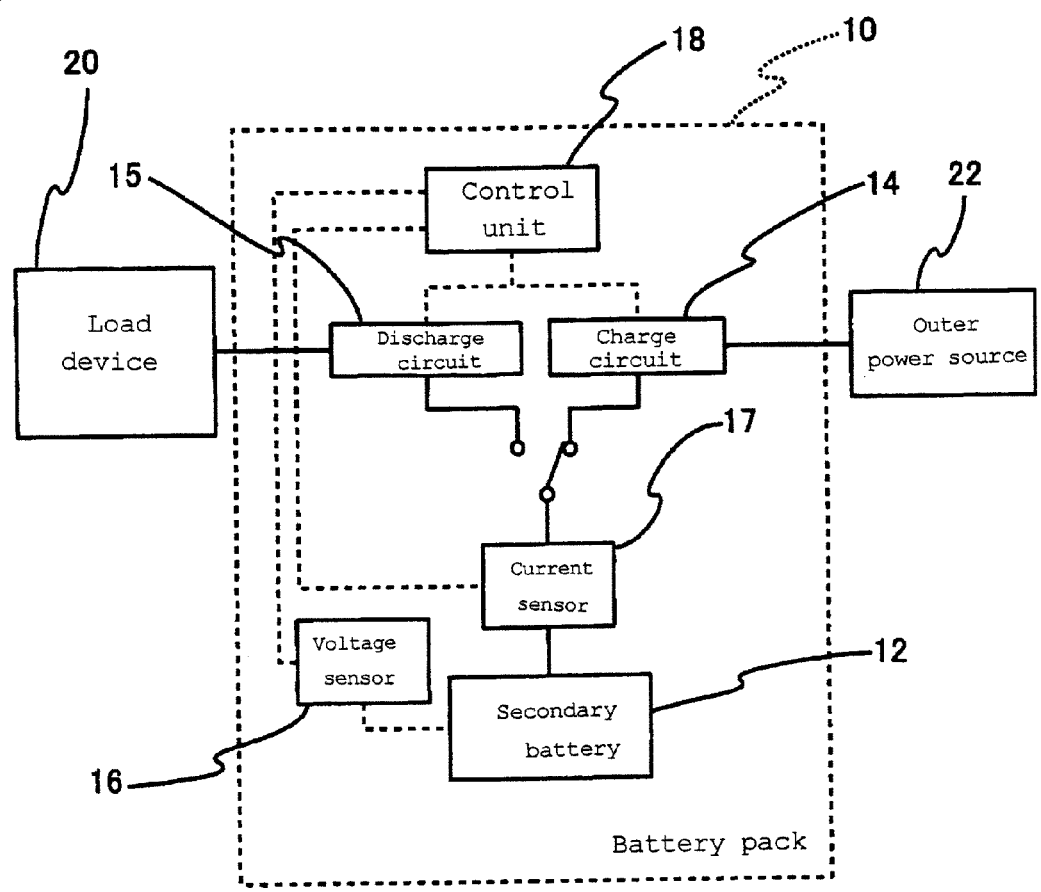
[FIG. 1] A function block diagram of a battery pack to which a method of charging a lithium ion secondary battery in accordance with an embodiment of the present invention is applied.

The present invention relates to a method of charging a non-aqueous electrolyte secondary battery by a constant current-constant voltage charge. In the present method, a constant current charge and a subsequent constant voltage charge are repeated n+1 times to charge a non-aqueous electrolyte secondary battery. More specifically, (1) an $n^{th}$ charge comprises charging the secondary battery at a current Ic(n) to a voltage Ec(n), and subsequently charging the secondary battery at the voltage Ec(n) until the current decreases from Ic(n) to Ic(n+1). (2) An $(n+1)^{th}$ charge comprises charging the secondary battery at a current Ic(n+1) to a voltage Ec(n+1), and subsequently charging the secondary battery at the voltage Ec(n+1) until the current decreases from Ic(n+1) to Ic(n+2).

That is, in the present method, the upper limit voltage of the constant current charge is switched by steps, that is, from Ec(1) to Ec(2) . . . and Ec(f) until it reaches an end-of-charge voltage Ec(f), where f is a maximum value of n and an integer of 2 or more. Also, Ec(1)<Ec(2)< . . . Ec(f). f is preferably 2 to 10, and particularly preferably 2 and 3.

Further, in the present method, the current Ic(n+1) at the constant current charge having an upper limit voltage Ec(n+1) is set to a current lower than the current Ic(n) at the constant current charge having an upper limit voltage Ec(n). When the upper limit voltage is switched from the voltage Ec(n) to the voltage Ec(n+1), the constant voltage charge is performed until the charge current decreases from the current Ic(n) to the current Ic(n+1). Further, in the present method, when the charge voltage reaches the end-of-charge voltage Ec(f), the constant voltage charge is performed at the end-of-charge voltage Ec(f) until the charge current decreases to a predetermined end-of-charge current.

As described above, in the present method, the upper limit voltage of the constant current charge is increased by steps to the end-of-charge voltage Ec(f), and the charge current is decreased as the upper limit voltage increases. As a result, a high-rate charge is performed in the low voltage area, and a low-rate charge is performed in the high voltage area. Consequently, the charge time can be shortened, and deterioration in the cycle characteristics due to decline in the lithium ion-acceptability of the negative electrode can be suppressed.

Herein, the cycle characteristics indicate the relation between the number of cycles and the discharge capacity when the charge and discharge of the secondary battery are repeated in a predetermined voltage range and under predetermined conditions. The number of cycles through which the discharge capacity decreases by a predetermined proportion from the initial capacity is called a cycle life, or simply a life of the secondary battery. Shortening of the life of the secondary battery is referred to as deterioration in the cycle characteristics.

Further, in the present method, when the charge current is switched, the charge current is not decreased immediately, but the charge current is decreased gradually to switch the charge current. As a result, as compared to the case where the charge current is decreased immediately, the average value of the charge current is increased, whereby the charge time can be shortened further. Therefore, it is possible to shorten the charge time while suppressing deterioration in the cycle characteristics of the secondary battery.

Herein, the positive electrode of the above non-aqueous electrolyte secondary battery preferably includes a material represented by the general formula: $LiNi_xCo_yM_{1-x-y}O_2$, where M is at least one element selected from the group consisting of group 2 elements, group 3 elements, group 4 elements, group 7 elements, and group 13 elements in the long form of the periodic table, $0.3 \leq x < 1$, and $0 < y < 0.4$.

A lithium ion secondary battery using a lithium nickelate-based lithium-containing composite oxide (Ni-based positive electrode material, hereinafter) as the positive electrode active material (Ni-based positive electrode battery) can easily shorten the charge time when charged by the constant current-constant voltage charge as compared with a lithium ion secondary battery using a lithium cobaltate-based lithium-containing composite oxide (Co-based positive electrode material, hereinafter) as the positive electrode active material (Co-based positive electrode battery). It is noted that the larger the value x in the above general formula is, the closer the positive electrode material is to the Ni-based positive electrode material.

This is because the Ni-based positive electrode material has a lower electric potential than the Co-based positive electrode material when compared at the same charge depth. In other words, in the Ni-based positive electrode battery, the charge voltage has a lower profile than that of the Co-based positive electrode battery. Consequently, even when batteries having the same capacity are charged at the same current, the time before which the charge voltage reaches the lowest target voltage is longer in the Ni-based positive electrode battery than in the Co-based positive electrode battery. As a result, the proportion of the constant current charge area in the entire charge can be increased.

Therefore, even when the Ni-based positive electrode battery and the Co-based positive electrode battery are charged to the same upper limit voltage, a larger proportion of quantity of electricity can be charged by the constant current charge in the Ni-based positive electrode battery than in the Co-based positive electrode battery. Since the constant current charge has a higher charge rate (charge current) than the constant voltage charge, the charge time can be shortened by increasing the proportion of the constant current charge area in the entire charge.

Consequently, the charge of the Ni-based positive electrode battery can be completed within a charge time of the same level as that of the Co-based positive electrode battery even when the charge current is decreased. As a result, the cycle characteristics of the Ni-based positive electrode battery can be improved by having a charge time of the same level as that of the Co-based positive electrode battery. Therefore, by using the lithium-containing composite oxide represented by the above general formula in the positive electrode material, the charge time can be shortened easily while deterioration in the cycle characteristics can be suppressed.

Further, in the present method, the voltage $Ec(1)$ is preferably a predetermined voltage in the range of 3.8 to 4 V, and the current $Ic(1)$ in the constant current charge having the voltage $Ec(1)$ as the upper limit voltage is preferably a predetermined current in the range of 0.7 to 2 C. Herein, a current of 1 C (=1 It) is a current capable of charging or discharging a quantity of electricity corresponding to the nominal capacity of the secondary battery in an hour. A current of 0.7 C is a 0.7 times current thereof, and a current of 2 C is a two times current thereof.

The current $Ic(1)$ is the highest charge current in the present method, and when the secondary battery is charged at the constant current $Ic(1)$, decline in the lithium ion-acceptability of the negative electrode can be prevented by setting the upper limit voltage to the voltage $Ec(1)$ of 4 V or less. Consequently, shortening of the cycle life can be prevented. Meanwhile, it is possible to prevent the charge time from becoming excessively long by setting the voltage $Ec(1)$ to 3.8 V or more. From above, shortening of the charge time and improvement in the cycle characteristics can be easily compatible by setting the voltage $Ec(1)$ to the above range.

Further, it is possible to prevent the charge time from becoming excessively long by setting the current $Ic(1)$ to 0.7 C or more. Meanwhile, decline in the lithium ion-acceptability of the negative electrode can be suppressed by setting the current $Ic(1)$ to 2 C or less. Therefore, deterioration in the cycle characteristics can be suppressed. A more preferable range of the current $Ic(1)$ is 0.7 to 1.5 C.

Moreover, in the present method, the current $Ic(f)$ in the constant current charge, in which the end-of-charge voltage $Ec(f)$ is 4 to 4.4 V and the end-of-charge voltage $Ec(f)$ is the upper limit voltage, is preferably 0.3 to 0.7 C.

By setting the end-of-charge voltage $Ec(f)$ to 4.4 V or less, side reactions such as decomposition reaction of the non-aqueous electrolyte can be suppressed. Thus, deterioration in the cycle characteristics can be suppressed. Meanwhile, by setting the end-of-charge voltage $Ec(f)$ to 4 V or more, it is possible to prevent the discharge capacity from decreasing excessively.

Further, by setting the current $Ic(f)$ to 0.7 or less, deterioration in the cycle characteristics can be suppressed in a high voltage area where the lithium ion-acceptability of the negative electrode tends to decline. Meanwhile, by setting the current $Ic(f)$ to 0.3 or more, it is possible to prevent the charge time from becoming excessively long.

Further, the present invention relates to a battery pack comprising at least a non-aqueous electrolyte secondary battery, a charge circuit that charges the secondary battery by an electric power from an outer power source, and a control unit that controls charge of the secondary battery by the charge circuit. The control unit controls the current and the voltage of the charge circuit such that the charge circuit charges the non-aqueous electrolyte secondary battery by repeating n+1 times a constant current charge and a subsequent constant voltage charge.

When such a control is performed, the control unit controls such that: (1) an $n^{th}$ charge comprises charging the secondary battery at a current $Ic(n)$ to a voltage $Ec(n)$, and subsequently charging the secondary battery at the voltage $Ec(n)$ until the current decreases from $Ic(n)$ to $Ic(n+1)$; and (2) an $(n+1)^{th}$ charge comprises charging the secondary battery at the current $Ic(n+1)$ to a voltage $Ec(n+1)$, and subsequently charging the secondary battery at the voltage $Ec(n+1)$ until the current decreases from $Ic(n+1)$ to $Ic(n+2)$. It is noted that the voltage and the current in the charge cycle are equal to the voltage and the current, respectively, at which the secondary battery is charged.

Embodiments of the present invention will be described by referring to drawings.

(Embodiment 1)

FIG. 1 is a function block diagram of a battery pack to which a method of charging a lithium ion secondary battery in accordance with Embodiment 1 of the present invention is applied.

A battery pack 10 includes a secondary battery 12, a charge circuit 14, a discharge circuit 15, a voltage sensor 16 that detects voltage of the secondary battery 12, a current sensor 17 that detects charge current and discharge current of the secondary battery 12, and a control unit 18 that controls charge and discharge of the secondary battery 12. The battery pack 10 can be connected with a load device 20 and an outer power source 22. When the secondary battery 12 is charged, the secondary battery 12 is connected with the charge circuit 14, and when the secondary battery 12 is discharged, the secondary battery 12 is connected with the discharge circuit 15.

The secondary battery 12 of the battery pack 10 may be a lithium ion secondary battery or an assembled battery in which two or more lithium ion secondary batteries are connected in parallel and/or in series. As for the control unit 18, a part of control function of the control unit 18 described below may be given to the load device 20, or the battery pack 10 may be included in a charger etc. for charging the battery pack 10.

The secondary battery 12 is connected with the load device 20 via the discharge circuit 15 and is connected with the outer power source 22 such as a commercial power source via the charge circuit 14. Values detected by the voltage sensor 16 and the current sensor 17 are transmitted to the control unit 18. To simplify the explanation, the example of FIG. 1 illustrates wiring in which the load device 20 receives supply of electric power only from the secondary battery 12. The present invention is not limited to this and includes the case where electric power is supplied from the outer power source 22 to the load device 20 while the secondary battery 12 is charged. In such a case, during the charge, the secondary battery 12 (charge circuit 14) and the load device 20 are connected in parallel with the outer power source 22.

The control unit 18 controls the charge circuit 14 and the discharge circuit 15 such that the voltage of the secondary battery 12 is maintained within a predetermined range. The control unit can be composed of a microcomputer, CPU (Central Processing Unit), MPU (Micro Processing Unit), main memory unit, and auxiliary memory unit etc.

The auxiliary memory unit (non-volatile memory etc.) stores information about more than one upper limit voltages when the secondary battery 12 is charged at constant current, information about charge currents corresponding to the respective upper limit voltages, information about end-of-charge voltage and end-of-charge current, and information about end-of-discharge voltage etc.

Next, an example of the lithium ion secondary battery used in the secondary battery 12 will be described by referring to FIG. 2. Although a lithium ion secondary battery 24 as illustrated in the figure has a cylindrical shape, the present invention is not limited thereto and can be applied to lithium ion secondary batteries having various shapes such as prismatic shape, flat shape, pin shape etc.

The lithium ion secondary battery 24 includes an electrode group 31 composed of a positive electrode 26, a negative electrode 28, and a separator 30 disposed therebetween that are wound spirally. The electrode group 31 is housed in a case 32 made of metal having a cylindrical shape with a bottom and an opening portion together with a non-aqueous electrolyte not illustrated in the figure. In the case 32, an upper insulating plate 36 and a lower insulating plate 38 are disposed on an upper side and a lower side, respectively, of the electrode group 31.

The opening portion of the case 32 is sealed with an sealing plate assembly 34, whereby the electrode group 31 and the non-aqueous electrolyte are sealed inside the case 32. The sealing plate assembly 34 is mounted on a small-diameter portion 46 in the state of being electrically insulated from the case 32 by an insulating gasket 44. In such a state, an opening end portion of the case 32 is caulked such that a peripheral portion of the sealing plate assembly 34 is sandwiched by the small-diameter portion 46 and the opening end portion via the gasket 44, whereby the sealing plate assembly 34 is fitted to the opening portion of the case 32.

The sealing plate assembly 34 is connected with the positive electrode 26 via a positive electrode lead 40. Thus, the sealing plate assembly 34 functions as an outer terminal of the positive electrode 26. Meanwhile, the negative electrode 28 is connected with the case 32 via a negative electrode lead 48. Thus, the case 32 functions as an outer terminal of the negative electrode 28.

Figure 3:
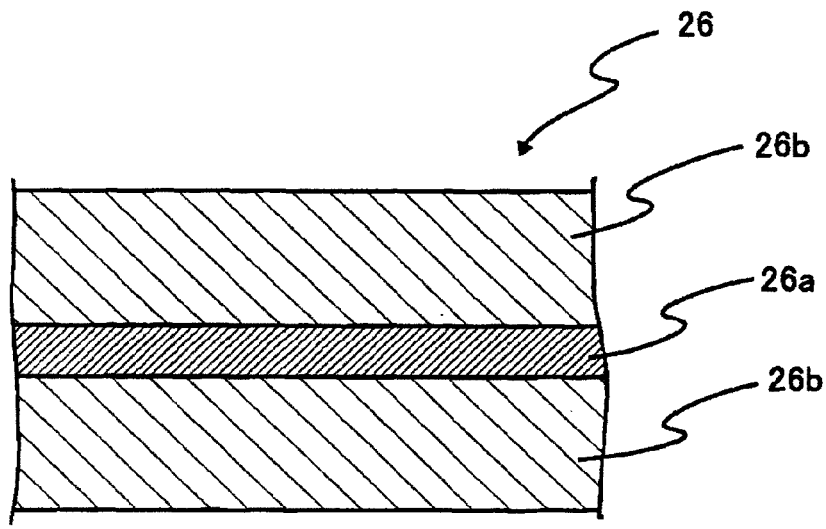
[FIG. 3] A cross sectional view of a main part of the positive electrode of the lithium ion secondary battery of FIG. 2.

As illustrated in FIG. 3, the positive electrode 26 includes a positive electrode current collector 26a composed of an aluminum foil, for example, and a positive electrode active material layer 26b formed on at least one surface of the positive electrode current collector 26a. The positive electrode active material layer 26b is composed of a mixture of a positive electrode active material, a conductive material, and a binder.

As the positive electrode active material, it is preferable to use a lithium-containing composite oxide represented by the general formula: $LiNi_xCo_yM_{1-x-y}O_2$, where M is at least one element selected from the group consisting of group 2 elements, group 3 elements, group 4 elements, group 7 elements, and group 13 elements in the long form of the periodic table, $0.3 \leq x < 1.0$, and $0 < y < 0.4$. By using this lithium-containing composite oxide as the positive electrode active material, remarkable effects of shortening the charge time and improving the charge and discharge cycle life characteristics can be obtained. Such a lithium-containing composite oxide can be produced by a publicly known method. x preferably satisfies $0.6 \leq x \leq 0.9$ and y preferably satisfies $0.05 \leq y \leq 0.2$.

By setting x to 0.3 or more, it is possible to obtain a remarkable effect of decreasing the charge voltage by using a Ni-based positive electrode material. Also, by setting y to less than 0.4, a remarkable effect of decreasing the charge voltage can be achieved. By adding the aforementioned M, it is possible to improve the charge and discharge cycle life characteristics while a high capacity can be obtained easily. Examples of the group 2 elements include Mg and Ca. Examples of the group 3 elements include Sc and Y. Examples of the group 4 elements include Ti and Zr. Examples of the group 7 elements include Mn. Examples of the group 13 elements include B and Al. Among these elements, Al is the most preferable as M in view of having excellent stability in the crystal structure and ensuring safety.

As the conductive material, carbon material such as natural graphite, artificial graphite, carbon black, and acetylene black can be used. As the binder, polyvinylidene fluoride (PVDF) or polytetrafluoroethylene (PTFE) can be used. As the positive electrode current collector, a metal foil such as an aluminum foil can be used. The positive electrode can be produced by applying, onto the positive electrode current collector, a positive electrode paste prepared by dispersing a mixture of the positive electrode active material, the conductive material, and the binder in a dispersing medium such as N-methyl-2-pyrrolidone and subsequently drying the same.

In the same manner as the positive electrode 26, the negative electrode 28 includes a negative electrode current collector and a negative electrode active material layer formed on the negative electrode current collector. The negative electrode active material layer may be a deposited film formed by vapor deposition etc. or a mixture of negative electrode active material, conductive material, and binder. As the negative electrode active material, carbon material capable of absorbing and desorbing lithium, artificial graphite, or natural graphite can be used. Also, silicon alloys or silicon oxides can be used. As the negative electrode current collector, a metal foil such as a nickel foil and a copper foil can be used. As the conductive material and the binder, the same materials used in the positive electrode can be used. The negative electrode can be produced by applying, onto the negative electrode current collector, a negative electrode paste prepared by dispersing a mixture of the negative electrode active material, the conductive material, and the binder in a dispersing medium such as N-methyl-2-pyrrolidone and subsequently drying the same.

The non-aqueous electrolyte includes a non-aqueous solvent and a supporting salt dissolved in the non-aqueous solvent. As the supporting salt, a lithium salt such as lithium hexafluorophosphate (LiPF$_6$) can be used. As the non-aqueous solvent, a solvent mixture of a cyclic ester such as ethylene carbonate (EC) and propylene carbonate (PC) and a chain ester such as dimethyl carbonate (DMC), diethyl carbonate (DEC), and methyl ethyl carbonate (MEC) is used.

Next, a charge process performed by the control unit 18 will be explained. In this charge process, the secondary battery 12 is charged by performing alternately a constant current charge and a constant voltage charge. That is, the constant current charge including 2 or more steps is performed by switching by steps the upper limit voltage and the charge current. Then, after the constant current charge of each step, the constant voltage charge is performed.

The value of the upper limit voltage in the constant current charge of each step is represented by Ec(n), wherein n=1, 2, . . . , f, where f is an integer of 2 or more, and Ec(1)<Ec(2)< . . . Ec(f). The current in the constant current charge where the upper limit voltage is Ec(n) is represented by Ic(n). The highest voltage Ec(f) of the upper limit voltage is the end-of-charge voltage. When the current in the constant current charge is switched from Ic(n) to Ic(n+1), the current is decreased gradually at constant voltage.

Figure 4:
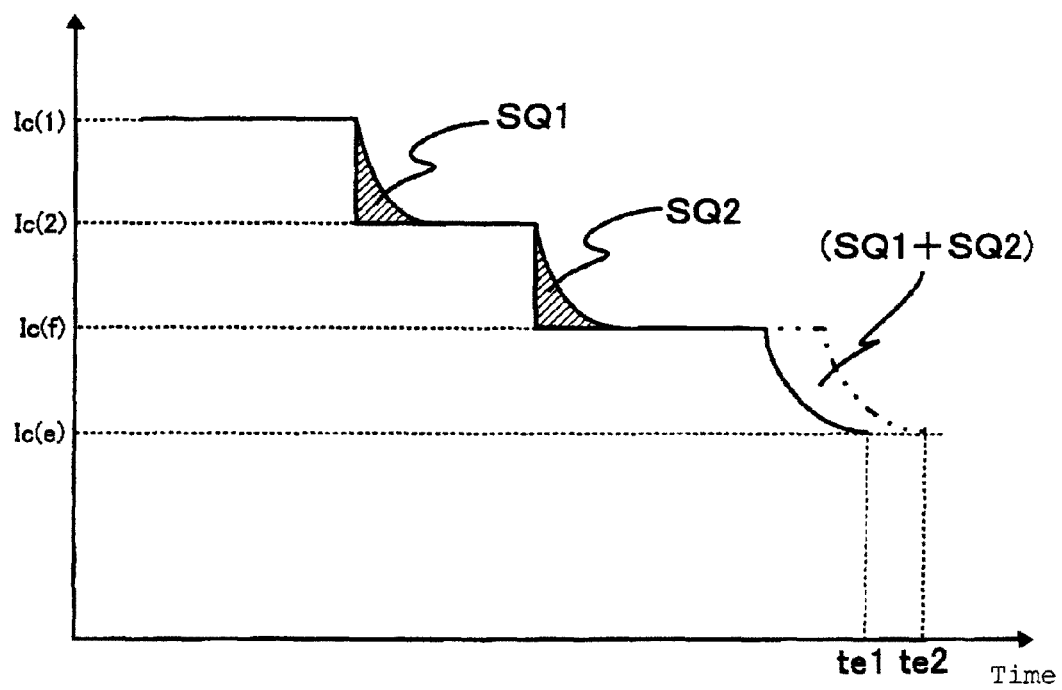
[FIG. 4] A graph showing temporal change of the charge current in the charge process.

FIG. 4 is an example of charge switching in the above charge process, and herein, the current in the constant current charge is switched by 3 steps of Ic(1), Ic(2), and Ic(f), where Ic(1)>Ic(2)>Ic(f). Consequently, a high rate charge is performed in the low voltage area and a low rate charge is performed in the high voltage area. As a result, it is possible to shorten the charge time while suppressing deterioration in the secondary battery 12. Herein, the current Ic(e) is an end-of-charge current.

For example, when the current in the constant current charge is switched from Ic(1) to Ic(2), the current is decreased gradually by performing the constant voltage charge at the voltage Ec(1). The same approach is taken when the current in the constant current charge is switched from Ic(2) to Ic(f). In this manner, by decreasing gradually the current at the time of switching the charge current, it is possible to charge an extra quantity of electricity corresponding to an area (SQ1+SQ2) of the portion provided with slash lines in FIG. 4 as compared with the case of switching immediately the current.

As a result, it is possible to shorten the time before the charge is completed by the time (te2–te1) corresponding to the area (SQ1+SQ2). Therefore, it is possible to further shorten the charge time while suppressing deterioration in the secondary battery 12. It is noted that the number of steps in the constant current charge of the present invention is not limited to 3 steps as illustrated in FIG. 4 but can be set freely to 2 or more steps.

Figure 5:
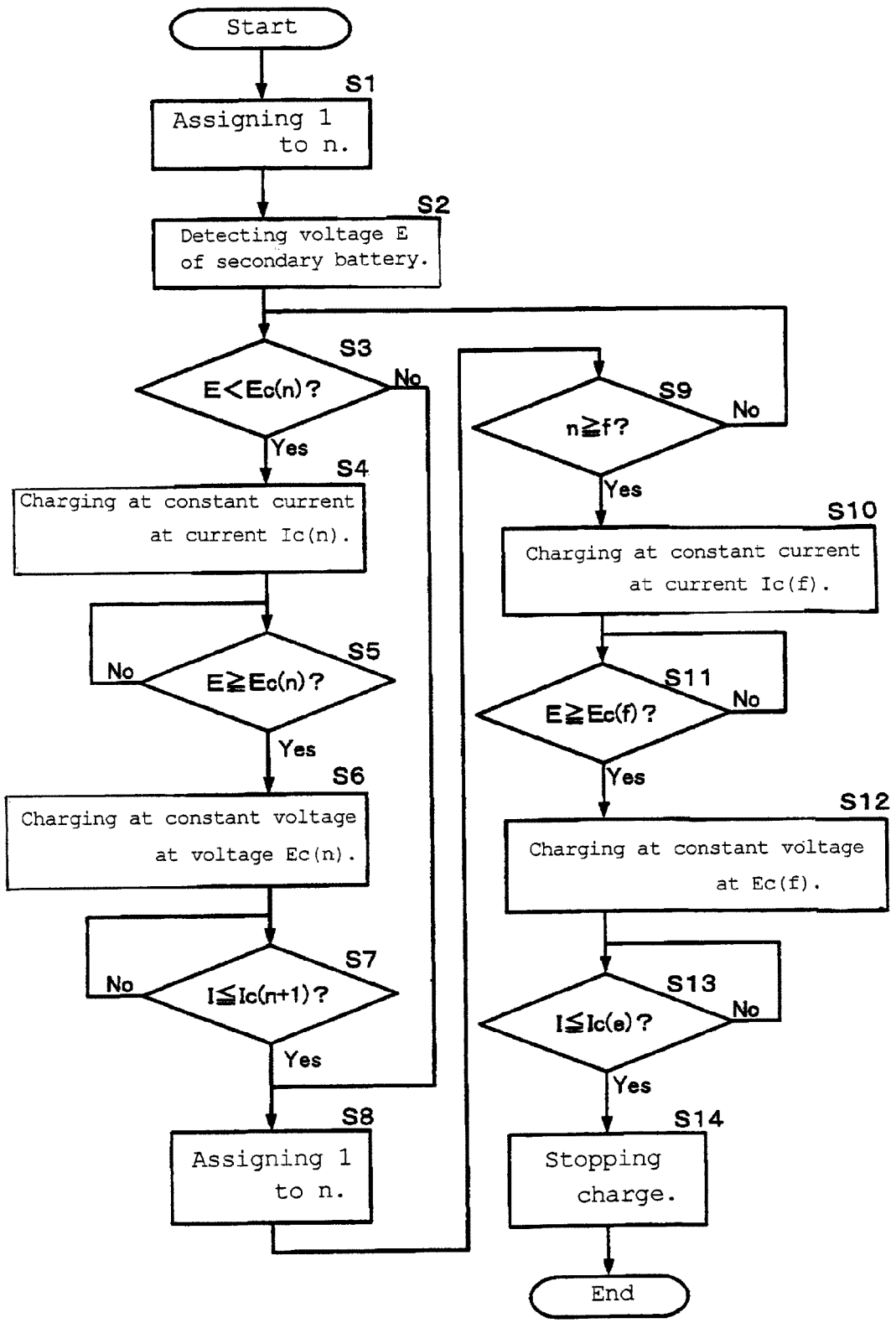
[FIG. 5] A flowchart of the charge process.

In the following, the above charge process will be described by referring to FIG. 5. FIG. 5 is a flowchart of a process performed, for example, by a CPU in the control unit. The process of FIG. 5 is performed repeatedly with every predetermined time.

In FIG. 5, when the charge of the secondary battery 12 is started, a value "1" is assigned to a variable n (step S1), and the voltage E of the secondary battery 12 is detected by the voltage sensor 16 (step S2). Next, the voltage E is compared with the voltage Ec(n), and whether E is smaller than Ec(n) is determined (step S3). First, n=1 and the voltage E is compared with the voltage Ec(1) which is the lowest upper limit voltage. Herein, Ec(1) is preferably a voltage in the range of 3.8 to 4 V. As the voltage E, it is possible to use a value obtained by detecting voltages of the secondary battery 12 every predetermined time (e.g. 25 ms), and calculating by moving average of the detected voltages.

If E is smaller than Ec(n) (Yes at step 3), the current Ic(n) corresponding to the voltage Ec(n) is read out from the information about the charge current. Then, the output current of the charge circuit 14 is controlled such that the current I detected by the current sensor 17 is equal to the current Ic(n). Thus, the secondary battery 12 is charged at the constant current Ic(n) (step S4). If n=1, the current Ic(n) is Ic(1). Herein, the current Ic(1) is preferably a current in the range of 0.7 to 2 C. If E is Ec(n) or more (No at step S3), the process is proceeded to step S8 described below.

When the secondary battery is charged at the constant current Ic(n), the voltage E is compared with the voltage Ec(n), and whether E is equal to or higher than Ec(n) is determined (step S5). If E is less than Ec(n) (No at step S5), this step 5 is repeated until the voltage E rises to the voltage Ec(n) or more (Yes at Step 5).

If the voltage E is equal to or higher than Ec(n) (Yes at step S5), the charge mode is switched from the constant current charge to the constant voltage charge, and the constant voltage charge is performed at the voltage Ec(n) (step S6). Then, from the information about the charge current, the current Ic(n+1) which is the charge current when the upper limit voltage is the voltage Ec(n+1) is read out as the lower limit voltage of this constant voltage charge. When n=1, Ic(n+1)=Ic(2).

Next, during this constant voltage charge, whether the current I detected by the current sensor 17 is equal to or less than Ic(n+1) is determined (step 7). If the current I is higher than Ic(n+1) (No at step S7), this step S7 is repeated until the current I decreases to Ic(n+1) or less. If the current I is equal to or less than the Ic(n+1) (Yes at step S7), a value "1" is added to the variable n (step S8), and whether the variable n which is a result of this addition reaches the value "f" is determined (step S9).

If the variable n does not reach the value "f" (No at step S9), the process of step S3 and subsequent processes are repeated. For example, by assigning 2 to n, the process of step S3 and subsequent processes are repeated. If the variable n reaches the value "f" (Yes at step S9), the upper limit voltage of the constant voltage charge is considered to be switched to the end-of-charge voltage Ec(f), and the current Ic(f) of the constant current charge when the upper limit voltage is the end-of-charge voltage Ec(f) is read out from the information about the charge current. Consequently, the secondary battery 12 is charged at the constant current Ic(f) (step S10).

Next, the voltage E is compared with the voltage Ec(f) and whether E is equal to or more than Ec(f) is determined (step S11). If E is less than Ec(f) (No at step S11), this step S11 is repeated until the voltage E becomes equal to or more than the voltage Ec(f) (Yes at step S11).

If the voltage E is equal to or more than the voltage Ec(f) (Yes at step S11), the charge mode is switched from the constant current charge to the constant voltage charge, and the constant voltage charge is performed at the voltage Ec(f) (step S12), and also the end-of-charge current Ic(e) is read out form the information about the charge current. Next, whether the current I detected by the current sensor 17 during the constant voltage charge is equal to or less than Ic(e) is determined (step S13). If the current I is higher than Ic(e) (No at step S13), this step S13 is repeated until the current I decreases to Ic(e) or less. If the current I is equal to or less than Ic(e) (Yes at step S13), the charge is stopped (step S14) and the process is ended.

In the following, examples of the present invention will be described in detail. It is to be note that the present invention is not limited by the following examples.

EXAMPLE 1

Figure 2:
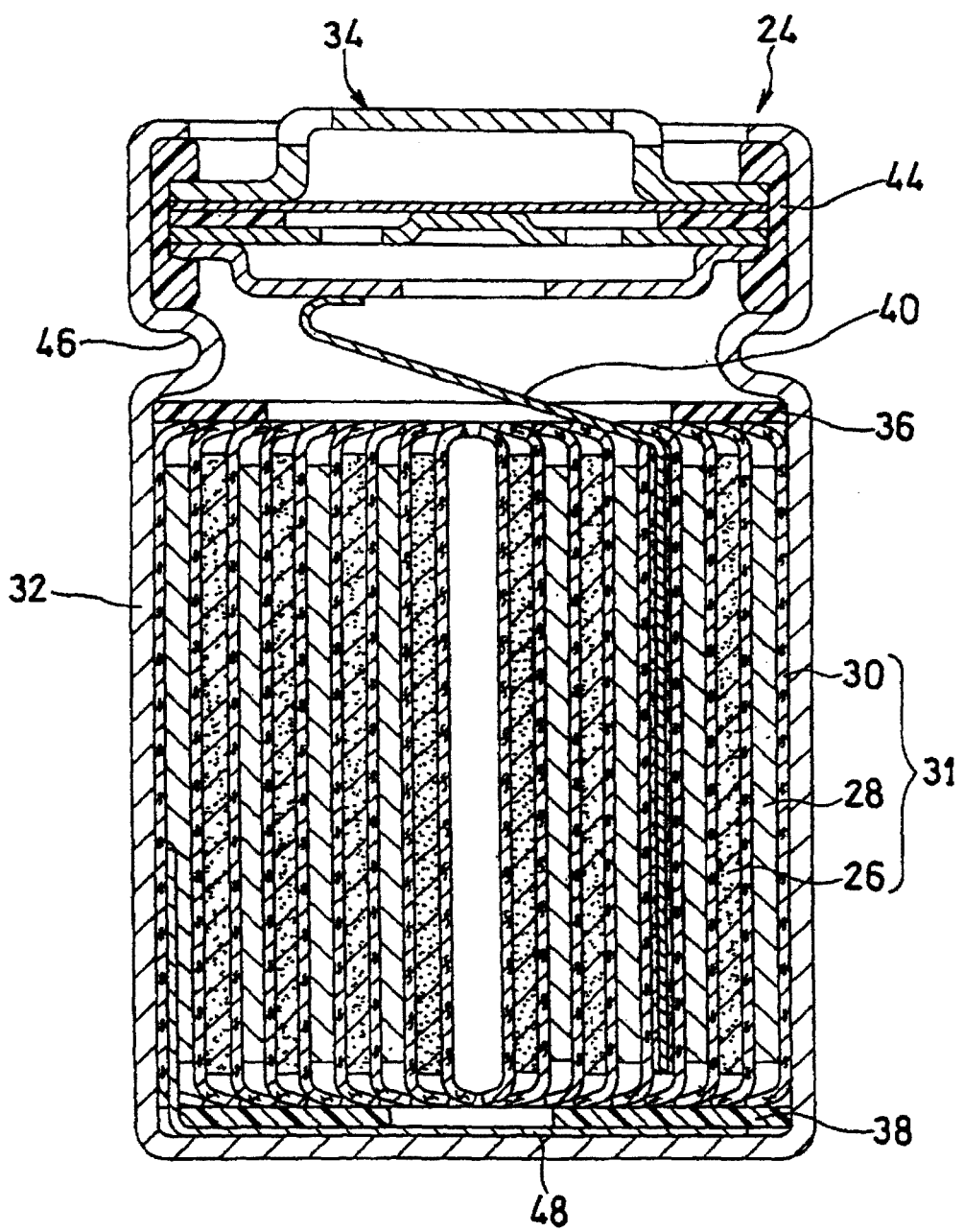
[FIG. 2] A vertical cross sectional view of an example of a lithium ion secondary battery included in the battery pack of FIG. 1.

A cylindrical lithium ion secondary battery as illustrated in FIG. 2 used for the charge method of the present invention is produced by the following procedures.

(1) Production of Positive Electrode

A positive electrode paste was produced by stirring 100 parts by weight of $LiNi_{0.8}Co_{0.15}Al_{0.05}O_2$ as the positive electrode active material, 1.7 parts by weight of PVDF as the binder, 2.5 parts by weight of acetylene black as the conductive material, and an appropriate amount of N-methyl-2-pyrrolidone by a double-arm kneader.

The positive electrode paste was applied onto both surfaces of a positive electrode current collector made of an aluminum foil having a thickness of 15 μm, which was then dried to form positive electrode active material layers on both surfaces of the positive electrode current collector. Thus, a positive electrode having a plate form was obtained. Subsequently, this positive electrode was rolled and cut to produce a positive electrode having a strip form (thickness 0.110 mm, width 57 mm, length 720 mm).

(2) Production of Negative Electrode

A negative electrode paste was obtained by stirring 100 parts by weight of graphite as the negative electrode active material, 0.6 parts by weight of PVDF as the binder, 1 part by weight of carboxymethyl cellulose as the thickener, and an appropriate amount of water by a double-arm kneader. This negative electrode paste was applied onto both surfaces of a negative electrode current collector made of a copper foil having a thickness of 8 μm, which was then dried to form negative electrode active material layers on both surfaces of the negative electrode current collector. Thus, a negative electrode having a plate form was obtained. Subsequently, this negative electrode was rolled and cut to produce a negative electrode having a strip form (thickness 0.130 mm, width 58.5 mm, length 800 mm).

(3) Preparation of Non-Aqueous Electrolyte

A non-aqueous electrolyte was prepared by dissolving $LiPF_6$ at a concentration of 1 mol/L in a non-aqueous solvent prepared by mixing EC, MEC, and DMC in a volume ratio of 1:1:8.

(4) Assembly of Battery

The positive electrode, the negative electrode, and a separator that separates the two electrodes were spirally wound to form an electrode group. As the separator, a microporous film made of polypropylene having a thickness of 20 μm was used. This electrode group was introduced into a case (diameter: 18 mm, height: 65 mm). Herein, insulating members were disposed in an upper part and lower part, respectively, of the electrode group. The non-aqueous electrolyte prepared above was poured into the case.

A negative electrode lead led out from the negative electrode was welded to an inner bottom surface of the case. A positive electrode lead led out from the positive electrode lead was welded to a lower surface of the sealing plate assembly. The opening end portion of the case was caulked to a peripheral portion of the sealing plate assembly via the gasket, whereby the opening portion of the case was sealed. Thus, a 18650 size lithium ion secondary battery (diameter: 18 mm, height: 65 mm, nominal capacity: 1800 mAh) for test having a cylindrical shape was produced.

(First Step)

The lithium ion secondary battery for test was charged at constant current (CC charge) at a current of 0.7 C (Ic(1)) while setting the upper limit voltage to 4 V (Ec(1)). When the charge voltage reached 4 V, the secondary battery was charged at constant voltage (CV charge) at this voltage while setting the lower limit current to 0.5 C (Ic(2)).

(Second Step)

Next, the secondary battery was charged at the constant current (Ic(2)) of 0.5 C while setting the upper limit voltage to 4.1 V (Ec(2)). When the charge voltage reached 4.1 V, the secondary battery was charged at this constant voltage while setting the lower limit current to 0.3 C (Ic(f)).

(Third Step)

Next, the secondary battery was charged at constant current at the current (Ic(f)) of 0.3 C while setting the upper limit voltage to the end-of-charge voltage (Ec(f)) of 4.2 V. When the charge voltage reached 4.2 V, the secondary battery was charged at this constant voltage until the charge current decreased to the end-of-charge current of 50 mA.

When the charge current decreased to 50 mA, the charge was stopped. 20 minutes thereafter, the discharge was performed at a discharge rate of 1 C while setting the end-of-discharge voltage to 2.5 V. This cycle of the charge and discharge process was repeated 300 times.

COMPARATIVE EXAMPLE 1

300 cycles of the charge and discharge process were repeated in the same manner as in Example 1 except that the constant voltage charge was not performed at the first and second steps, and the charge current was switched immediately from 0.7 C (Ic(1)) to 0.5 C (Ic(2)) and switched immediately from 0.5 C (Ic(2)) to 0.3 C (Ic(f)).

EXAMPLE 2

300 cycles of the charge and discharge process were repeated in the same manner as in Example 1 except for using $LiCoO_2$ as the positive electrode active material and setting the end-of-discharge voltage to 3 V.

COMPARATIVE EXAMPLE 2

300 cycles of the charge and discharge process were repeated in the same manner as in Comparative Example 1 except for using $LiCoO_2$ as the positive electrode active material and setting the end-of-discharge voltage to 3 V.

EXAMPLE 3

300 cycles of the charge and discharge process were repeated in the same manner as in Example 1 except for setting the upper limit voltage at the first step to 3.8 V.

COMPARATIVE EXAMPLE 3

300 cycles of the charge and discharge process were repeated in the same manner as in Comparative Example 1 except for setting the upper limit voltage at the first step to 3.8 V.

EXAMPLE 4

300 cycles of the charge and discharge process were repeated in the same manner as in Example 1 except for setting the current (Ic(1)) in the constant voltage charge at the first step to 2 C.

COMPARATIVE EXAMPLE 4

300 cycles of the charge and discharge process were repeated in the same manner as in Comparative Example 1 except for setting the current (Ic(1)) in the constant voltage charge at the first step to 2 C.

EXAMPLE 5

300 cycles of the charge and discharge process were repeated in the same manner as in Example 1 except for setting the lower limit current in the constant current charge at the first step to 0.3 C (Ic(2)) and omitting the second step.

COMPARATIVE EXAMPLE 5

300 cycles of the charge and discharge process were repeated in the same manner as in Comparative Example 1 except for omitting the second step.

EXAMPLE 6

300 cycles of the charge and discharge process were repeated in the same manner as in Example 5 except for using $LiCoO_2$ as the positive electrode active material and setting the upper limit voltage in the constant current charge at the third step to 4.4 V.

COMPARATIVE EXAMPLE 6

300 cycles of the charge and discharge process were repeated in the same manner as in Comparative Example 5 except for using $LiCoO_2$ as the positive electrode active material and setting the upper limit voltage in the constant current charge at the third step to 4.4 V.

The results of above are shown in Tables 1 and 2.

TABLE 1

| | | First step | | |
|---|---|---|---|---|
| | | CC charge | | CV charge |
| | Positive electrode active material | Current | Upper limit voltage | Lower limit current |
| Example 1 | $LiNi_{0.8}Co_{0.15}Al_{0.05}O_2$ | 0.7 C | 4 V | 0.5 C |
| Co. Ex. 1 | $LiNi_{0.8}Co_{0.15}Al_{0.05}O_2$ | 0.7 C | 4 V | — |
| Example 2 | $LiCoO_2$ | 0.7 C | 4 V | 0.5 C |
| Co. Ex. 2 | $LiCoO_2$ | 0.7 C | 4 V | — |
| Example 3 | $LiNi_{0.8}Co_{0.15}Al_{0.05}O_2$ | 0.7 C | 3.8 V | 0.5 C |
| Co. Ex. 3 | $LiNi_{0.8}Co_{0.15}Al_{0.05}O_2$ | 0.7 C | 3.8 V | — |
| Example 4 | $LiNi_{0.8}Co_{0.15}Al_{0.05}O_2$ | 2 C | 4 V | 0.5 C |
| Co. Ex. 4 | $LiNi_{0.8}Co_{0.15}Al_{0.05}O_2$ | 2 C | 4 V | — |
| Example 5 | $LiNi_{0.8}Co_{0.15}Al_{0.05}O_2$ | 0.7 C | 4 V | 0.3 C |
| Co. Ex. 5 | $LiNi_{0.8}Co_{0.15}Al_{0.05}O_2$ | 0.7 C | 4 V | — |
| Example 6 | $LiCoO_2$ | 0.7 C | 4 V | 0.5 C |
| Co. Ex. 6 | $LiCoO_2$ | 0.7 C | 4 V | — |

TABLE 2

| | Second step | | | Third step | | |
|---|---|---|---|---|---|---|
| | CC charge | | CC charge | CC charge | | CV charge |
| | Current | Upper limit voltage | Lower limit current | Current | Upper limit voltage | Lower limit current |
| Ex. 1 | 0.5 C | 4.1 V | 0.3 C | 0.3 C | 4.2 V | 50 mA |
| Co. Ex. 1 | 0.5 C | 4.1 V | — | 0.3 C | 4.2 V | 50 mA |
| Ex. 2 | 0.5 C | 4.1 V | 0.3 C | 0.3 C | 4.2 V | 50 mA |
| Co. Ex. 2 | 0.5 C | 4.1 V | — | 0.3 C | 4.2 V | 50 mA |
| Ex. 3 | 0.5 C | 4.1 V | 0.3 C | 0.3 C | 4.2 V | 50 mA |
| Co. Ex. 3 | 0.5 C | 4.1 V | — | 0.3 C | 4.2 V | 50 mA |
| Ex. 4 | 0.5 C | 4.1 V | 0.3 C | 0.3 C | 4.2 V | 50 mA |
| Co. Ex. 4 | 0.5 C | 4.1 V | — | 0.3 C | 4.2 V | 50 mA |
| Ex. 5 | — | — | — | 0.3 C | 4.2 V | 50 mA |
| Co. Ex. 5 | — | — | — | 0.3 C | 4.2 V | 50 mA |
| Ex. 6 | — | — | — | 0.3 C | 4.4 V | 50 mA |
| Co. Ex. 6 | — | — | — | 0.3 C | 4.4 V | 50 mA |

Regarding Examples 1 to 6 and Comparative Examples 1 to 6, an initial charge time (charge time at the first cycle) and a capacity retention rate were determined. The results are shown in Table 3. Herein, the capacity retention rate was determined by the following formula (I):

$$\text{Capacity retention rate (\%)} = \text{discharge capacity at the } 300^{th} \text{ cycle/discharge capacity at the first cycle} \times 100$$

TABLE 3

| | Initial charge time (minutes) | Capacity retention rate (%) |
|---|---|---|
| Example 1 | 151 | 71 |
| Co. Ex. 1 | 164 | 71 |
| Example 2 | 156 | 71 |
| Co. Ex. 2 | 168 | 71 |
| Example 3 | 166 | 74 |
| Co. Ex. 3 | 179 | 74 |
| Example 4 | 131 | 59 |
| Co. Ex. 4 | 144 | 59 |
| Example 5 | 165 | 73 |
| Co. Ex. 5 | 176 | 73 |
| Example 6 | 175 | 69 |
| Co. Ex. 6 | 185 | 69 |

It is found that in Example 1 in which the charge current is gradually decreased when switching the charge current, only the charge time is shortened without decreasing the capacity retention rate as compared with Comparative Example 1 in which the charge current is switched immediately. This can also be said with regard to results of comparison of Example 2 with Comparative Example 2, Example 3 with Comparative Example 3, Example 4 with Comparative Example 4, Example 5 with Comparative Example 5, and Example 6 with Comparative Example 6.

The main cause of deterioration in the cycle characteristics during the high rate charge is considered that the lithium ion-acceptability of the negative electrode during the charge declines. Basically, the present invention achieves a lithium ion secondary battery having a longer life by charging the lithium ion secondary battery by high-rate charge in the constant voltage area where depth of charge is small and by charging the lithium ion secondary battery by low-rate charge in the high voltage area where depth of charge is large. Then, the charge time is shortened by switching gradually the charge current. From the results of Examples and the corresponding Comparative Examples, it is found that the present invention permits both shortening of the charge time and improvement in the cycle characteristics.

Further, in comparison among Examples, Example 1 using $LiNi_{0.8}Co_{0.15}Al_{0.05}O_2$ as the positive electrode active material has a shorter initial charge time than Example 2 using $LiCoO_2$ as the positive electrode active material. Thus, it is found that the charge time can be shortened further by using $LiNi_{0.8}Co_{0.15}Al_{0.05}O_2$ as the positive electrode active material.

Comparing Example 3 with Example 1, since the upper limit voltage in the constant current charge at the first step of high-rate charge is lower in Example 3 than in Example 1, the initial charge time is longer than in Example 1. On the contrary, the capacity retention rate is improved further. Example 4 in which the current in the constant voltage charge at the first step is 2 C has a lower capacity retention rate than the other Examples. Examples 5 and 6 in which the second step is omitted have a slightly longer charge time.

Further, Example 6 in which the end-of-charge voltage is 4.4 V has a longer initial charge time than Example 1 in which the end-of-charge voltage is 4.2 V. However, the higher the end-of-charge voltage is, the larger the discharge capacity is, so the charge time naturally becomes longer accordingly. Meanwhile, Example 6 has a capacity retention rate of 69%, which is a sufficiently permissible result.

INDUSTRIAL APPLICABILITY

Since the charge method of the present invention can prolong the life of non-aqueous electrolyte secondary batteries and can shorten the charge time thereof, it can be applied suitably to power sources for electronic devices such as portable devices and information devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10. Battery pack
12. Secondary battery
14. Charge circuit
16. Voltage sensor
17. Current sensor
18. Control unit

The invention claimed is:

1. A charging method for a non-aqueous electrolyte secondary battery, comprising repeating f times a charging sequence of a constant current charge and a constant voltage charge, subsequent to the constant current charge, where f is an integer of 2 or more, wherein:
an $n^{th}$ charging sequence comprises charging the secondary battery at a current $Ic(n)$ until a voltage of the secondary battery increases to $Ec(n)$, and subsequently charging the secondary battery at the voltage $Ec(n)$ until the current decreases from $Ic(n)$ to $Ic(n+1)$, and
an $(n+1)^{th}$ charging sequence comprises charging the secondary battery at the current $Ic(n+1)$ until the voltage of the secondary battery increases to $Ec(n+1)$, and subsequently charging the secondary battery at the voltage $Ec(n+1)$ until the current decreases from $Ic(n+1)$ to $Ic(n+2)$,
where n is an integer of 1 or more and f-1 or less.

2. The charging method in accordance with claim 1, wherein:
the secondary battery comprises a positive electrode, a negative electrode, and a non-aqueous electrolyte, and
the positive electrode includes a material represented by the general formula: $LiNi_xCo_yM_{1-x-y}O_2$, where M is at least one element selected from the group consisting of group 2 elements, group 3 elements, group 4 elements, group 7 elements, and group 13 elements in the long form of the periodic table, $0.3 \leq x < 1$, and $0 < y < 0.4$.

3. The charging method in accordance with claim 1, wherein, when n=1, a voltage $Ec(1)$ is 3.8 to 4 V, and a current $Ic(1)$ is 0.7 to 2 C.

4. The charging method in accordance with claim 3, wherein an end-of-charge voltage $Ec(f)$, is larger than the voltage $Ec(n)$ and is 4 to 4.4 V, and a current $Ic(f)$ is smaller than the current $Ic(n)$ and is 0.3 to 0.7 C.

5. A battery pack comprising:
at least one non-aqueous electrolyte secondary battery;
a charge circuit configured to receive an electric power from an outer power source, and to charge the secondary battery; and
a control unit that controls charge of the secondary battery by the charge circuit, wherein:
the control unit that controls the charge circuit such that the charge circuit charges the secondary battery by repeating f times a charging sequence of a constant current charge and a constant voltage charge, subsequent to the constant current charge, where f is an integer of 2 or more,
an $n^{th}$ charging sequence comprises charging the secondary battery at a current $Ic(n)$ until a voltage of the secondary battery increases to $Ec(n)$, and subsequently charging the secondary battery at the voltage $Ec(n)$ until the current decreases from $Ic(n)$ to $Ic(n+1)$, and
an $(n+1)^{th}$ charging sequence comprises charging the secondary battery at the current $Ic(n+1)$ until the voltage of the secondary battery increases to $Ec(n+1)$, and subsequently charging the secondary battery at the voltage $Ec(n+1)$ until the current decreases from $Ic(n+1)$ to $Ic(n+2)$,
where n is an integer of 1 or more and f-1 or less.

* * * * *